July 4, 1967

G. T. WATERS 3,329,224

APPARATUS FOR AUTOMATICALLY CONTROLLING
ELECTRICALLY ACTUATED MACHINERY

Filed Nov. 23, 1964

INVENTOR.
GEORGE T. WATERS

BY *Roy F. Koppenhofer*

AGENT

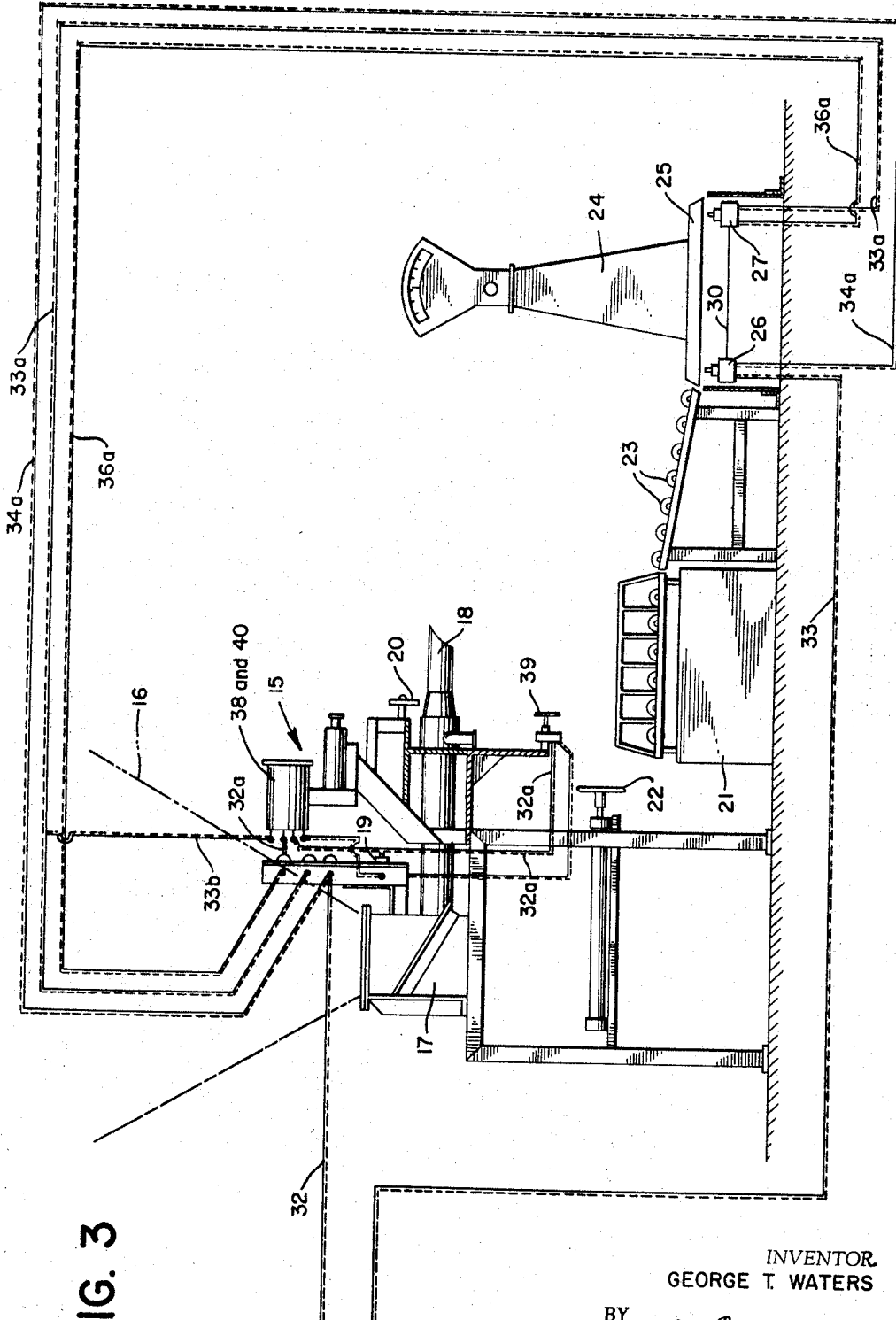

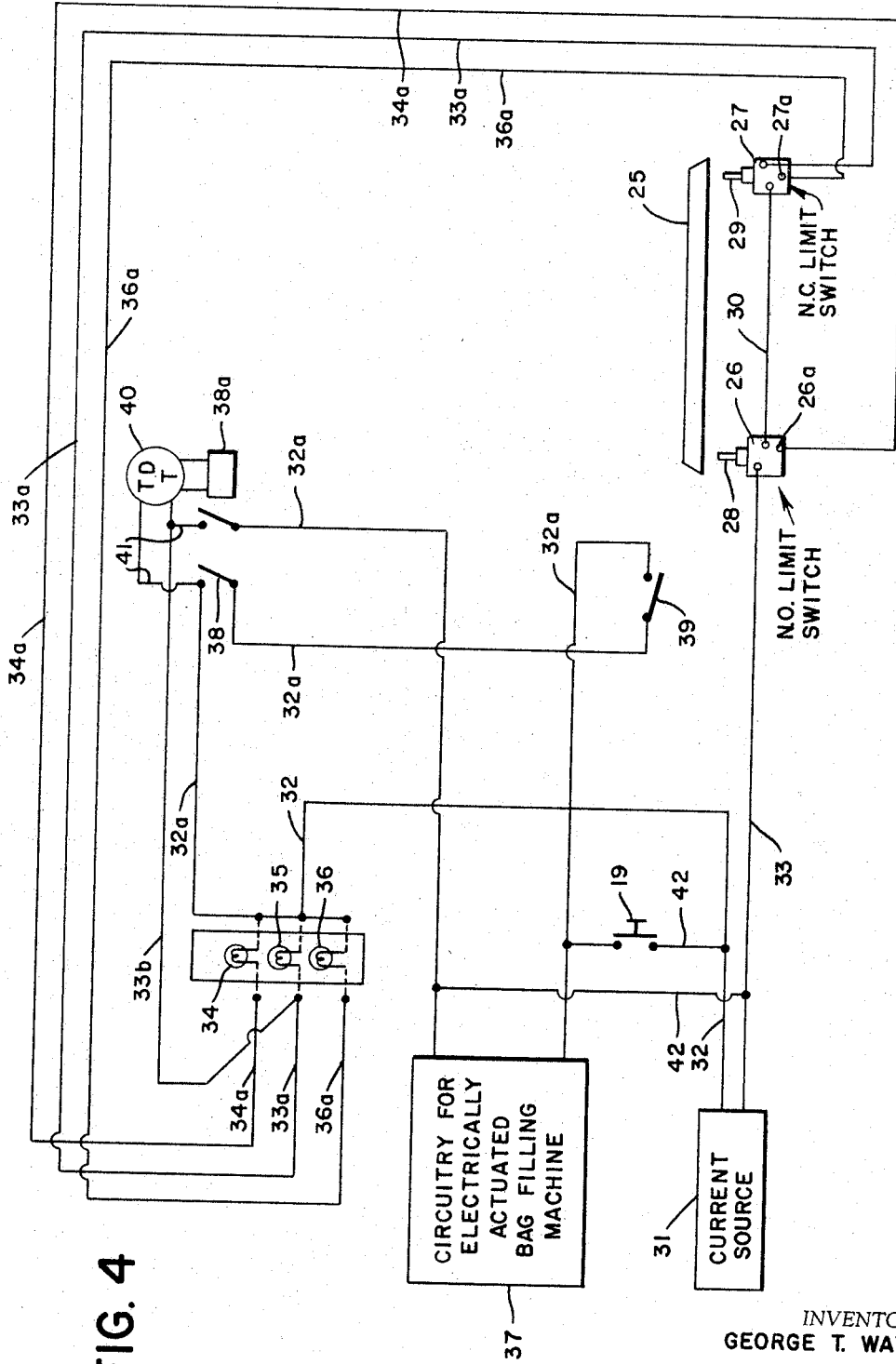

United States Patent Office 3,329,224
Patented July 4, 1967

3,329,224
APPARATUS FOR AUTOMATICALLY CONTROLLING ELECTRICALLY ACTUATED MACHINERY
George T. Waters, Conroe, Tex., assignor to Columbian Carbon Company, New York, N.Y., a corporation of Delaware
Filed Nov. 23, 1964, Ser. No. 413,192
3 Claims. (Cl. 177—118)

In its broadest aspect, the present invention relates to apparatus for controlling associated electrically actuated machinery. More particularly, the invention provides means whereby the supply of activating current to associated machinery is controlled in response to electro-mechanical determination of the weight of the units issuing from said associated machinery.

In another embodiment the invention relates to a container filling machine comprising apparatus for automatically actuating the filling machine in response to electro-mechanical determination of a specified weight possessed by a filled container. The term "specified weight," as used herein, means a preselected weight which may be either exact or within a certain range.

One of the major problems associated with filling machines heretofore devised is that an incorrect amount of material is often allocated to the container. In order to ascertain whether a container is filled with a correct or incorrect amount of material, the filling machine is generally provided with a weight-checking device having a visual read-out scale. Such arrangements have left much to be desired. For instance, it is difficult for one operator to efficiently operate more than one filling machine at a time. Furthermore, due to inadvertent misreading of the scale or inattention on the part of the operator, under-weight and over-weight containers are often permitted to pass from the weighing device without the weight thereof being corrected. The sale of off-weight containers is obviously detrimental to the interests of both customer and supplier.

Accordingly, it is one object of the present invention to provide apparatus for controlling the supply of activating current to associated electrically actuated machinery in response to electro-mechanical determination of the weight of the units issuing from such machinery.

It is another object of the invention to provide an improved filling machine.

It is another object of the invention to provide apparatus for automatically controlling the supply of activating current to a container filling machine in response to electromechanical determination of the weight of a container which has been filled, whereby activating current is supplied to the filling machine only when the filled container is determined to have a specified weight.

It is another object of the invention to provide apparatus for automatically activating a filling machine to fill a succeeding unfilled container upon electro-mechanically determining that a preceding filled container has a specified weight, and preventing automatic activation of the filling machine if the preceding container is off-weight.

It is still another object of the invention to provide an improved filling machine comprising means whereby material is automatically charged to a container to be filled only when the preceding filled container has a specified weight.

Various other objects and advantages of the invention will appear from the following detailed description thereof.

The invention will be further described and explained with reference to the drawings, which represent particular embodiments, but it will be understood that the invention is not limited to these embodiments since others will become apparent from the description and appended claims.

FIGURE 3 is a drawing of an electrically actuated bag filling machine and related apparatus to which the invention has been adapted for controlling activation of the bag filling machine; and FIGURE 4 is a diagram of circuitry which may be employed with the embodiment shown in FIGURE 3.

Figure 1:
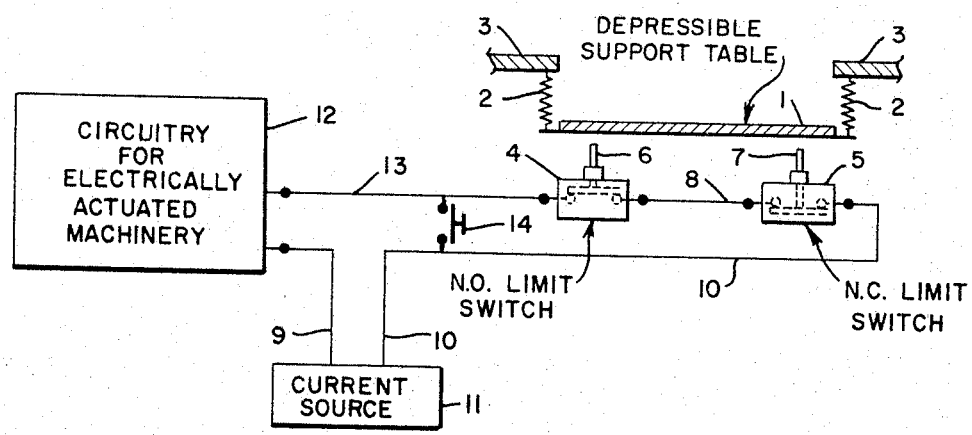
FIGURE 1 is a diagram illustrating electric circuitry and apparatus which may be employed in carrying out the invention.

Referring to FIGURE 1, a depressible support table 1 is freely suspended by means of springs 2 from hangers 3. When a mass, for instance, a unit issuing from associated machinery, is placed upon the support table, the springs yield to the weight of the mass so that the table moves downwardly while remaining level. Depression of the table is countered by the springs and downward travel ceases when spring tension balances the force exerted on the mass by gravity. The extent to which the table responds, i.e. moves downwardly in compliance to the mass, is therefore proportional to the mass weight. Located beneath the support table 1 are a normally open limit switch 4 and a normally closed limit switch 5, each having respective switch actuator members 6 and 7. The switches are connected to each other by a conductor 8. Current is supplied to the switches through conductors 9 and 10 from a current source represented at 11. Circuitry for associated electrically actuated machinery, represented at 12, is wired in series with the switches through conductors 9, 10 and 13 to receive activating current from the source 11 when both switches 4 and 5 are closed at the same time. Activating current is automatically supplied to circuitry 12 and the machinery actuated therewith is therefore caused to operate automatically when both switches 4 and 5 are closed at the same time.

A push button switch 14 may be wired in parallel across the conductors 10 and 13 to permit manual activation of the circuitry 12 and afford means for over-riding the automatic activating means.

The switches are operated upon depression of their respective actuator members 6 and 7, and are arranged to effect closure of switch 4 and opening of switch 5 by progressive depression of the table 1. However, the arrangement is such that the normally open switch 4 is closed before the normally closed switch 5 is opened, thus permitting the closure of both switches at the same time. Accordingly, activating current may be supplied to the circuitry 12 only when the support table 1 is depressed to an extent corresponding to the depression caused by a unit having a specified weight.

By adjustment of the spacing between the support table 1 and the switch actuator members 6 and 7, or by other suitable methods, the extent to which the support table must be depressed to activate the circuitry 12 may be altered. Switch 4 is therefore closed upon effecting a specific response of table 1 by compliance to a unit having sufficient weight. In this case, "specific response" means depression of the support table to a specific extent, for example, 0.15 inch. Switch 5 is caused to open at a specific response greater than that required to close switch 4, for example, a table depression above 0.18 inch. Effecting a response of the support table which is equivalent or intermediate to those identified as specific, results in both switches 4 and 5 being closed at the same time.

Since response of the support table 1 is proportional to the weight of the unit placed thereon, the condition where switches 4 and 5 are closed at the same time results from compliance of the support table to a specified weight. Further, by selectively establishing the specific response limits, the specified weight required for automatically supplying activating current to the circuitry 12 may be set at an exact value or within acceptable limits.

For the purpose of illustration, the switches 4 and 5 may be arranged to close when a unit placed on the support table 1 has a specified weight of 25 lbs.±1 oz. If a unit placed on the support table has a weight within these limits, switch 4 will be closed by depression of the table, and activating current will automatically be supplied to the circuitry 12 of the associated machinery. If, however, the unit placed on the table is off-weight, i.e., has a weight less than or greater than the specified weight, activating current will not be supplied to the associated machinery. Thus, a unit weighing less than 24 lbs. 15 ozs. will not depress the table sufficiently to close switch 4, and a unit weighing in excess of 25 lbs. 1 oz. will depress the table to an extent sufficient to open switch 5.

Figure 2:
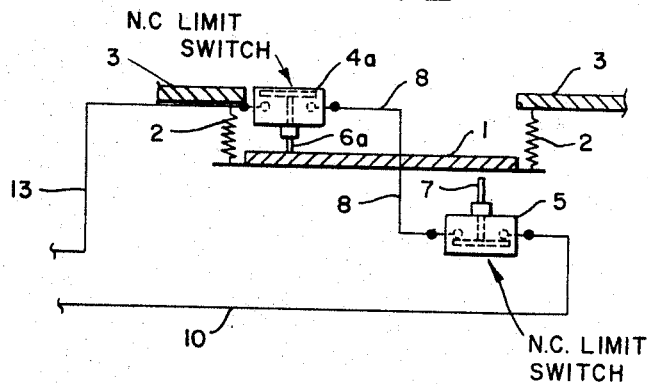
FIGURE 2 represents a variation of portions of the circuitry and apparatus of FIGURE 1.

Besides the spring suspended support table illustrated in the drawings, other weight respondent support means may be employed, including a balance beam, belt or diaphragm. The switch arrangement may also be varied within the scope of the invention. For instance, as shown in FIG. 2, a normally closed switch 4a, having an actuator 6a, is positioned above support table 1, and is adjusted to remain open until the table is depressed to an extent equivalent to a specific response required to effect its closure. Circuitry and apparatus which is otherwise identical to that described in reference to FIG. 1 may be employed with the arrangement of FIG. 2.

The automatic control apparatus described above may be employed to particular advantage to control the activation of electrically actuated machinery affiliated with continuous material allocation processes, wherein the amount of material allocated is readily determinable by weighing. Included in this category are processes for charging a specific quantity of liquid or gas into bottles, cans or the like, or for charging solid materials into bags, cartons, etc.

FIGS. 3 and 4 illustrate an embodiment of the invention adapted to an electrically activated bag filling machine for packaging finely-divided solid product. These filling machines contain internal actuating circuitry which normally is electrically activated by manual closure of a switch. The filling machine thereafter proceeds automatically through a program of events which includes clamping of a valve type bag on a filling spout, filling of the bag with a predetermined weight of finely-divided product, removal of the bag from the filling spout and conveying of the filled bag to a weighing scale.

Referring to FIG. 3, the bag filling machine is generally represented at 15. A finely-divided solid product is fed from a supply hopper 16 through fluidizing hopper 17 and a filling spout 18 of the bag filling machine. In the absence of the automatic control arrangement of the present invention, the bag filling process proceeds essentially as follows. The operator first places an empty bag on the filling spout 18. The push button 19 is then pressed by the operator to actuate the circuitry of the filling machine. Upon actuation, the filling machine automatically accomplishes a series of functions. Thus, the bag clamp 20 operates to secure the bag to the filling spout 18. The bag is filled with a preselected amount of product material, while a vibrator 21 shakes the material down into the bag. When the bag is filled, clamp 20 releases and a hydraulic ram 22 operates to push the bag off the vibrator 21 and down a roller conveyor 23 onto a proving scale 24 having a weigh table 25. The proving scale 24 may have a visible read-out pattern, as shown.

Adapting the automatic control arrangement of the present invention to the bag filling machine, as more clearly illustrated in FIG. 4, the process of filling the bag is essentially the same as before, with the exception that the filling machine is automatically activated by placement on the weigh table of a filled bag having a specified weight. Thus, in accordance with the invention, the filling machine is automatically activated to commence another filling operation only when the preceding filled bag is determined to have a specified weight.

In reference to FIGS. 3 and 4, the weigh table 25 of the proving scale 24 is employed as a depressible support table upon which a filled bag is placed. A normally open limit switch 26 and a normally closed limit switch 27 are located beneath the weigh table 25 and each switch has respective actuators, 28 and 29, that operate the switches upon depression of the table. Continuity between the two switches is provided by means of a conductor 30. Electric current is furnished to the switches from a current source, represented at 31, through conductors 32, 33, 33a and 30. Signal lamps 34 (red), 35 (green) and 36 (red) are series wired with conductors 32 and 33 by means, respectively of conductors 34a and switch 26; 33a, 30 and switch 27; and 36a, 30 and switches 26 and 27. The switches 26 and 27 are provided with terminals 26a and 27a respectively, for connecting conductors 34a and 36a respectively therewith. Thus arranged, lamp 35 (green) lights when both switches 26 and 27 are closed, lamp 34 (red) is light when the weigh table 35 is insufficiently depressed to close switch 26, and lamp 36 (red) lights when the weigh table 25 is depressed to an extent that switch 27 is opened. Activating current is supplied to the electric actuating circuitry of the bag filling machine, represented at 37, through conductors 33b and 32a, wired in parallel with conductors 33a and 32, only when switches 26 and 27 are closed at the same time.

Further, a double-pole, single-throw switch 38, operated by relay 38a, is located in lines 32a and 33b and a limit switch 39 is located in line 32a so that no current is supplied to activate the bag filling machine unless both switches 38 and 39 are closed at the same time. The relay 38a operating the switch 38 is actuated by means of an electric time delay timer 40, and both the timer and the relay are supplied with current through a conductor pair 41. In the illustrated case the time delay timer 40 is employed to prevent atuomatic energizing of the switches 26 and 27 when a filled bag is suddenly placed on the weigh table 25 causing the table to "rock" up and down. Such "rocking" normally lasts only for seconds, or a fraction thereof, and the time delay timer 40 may be set to close the switch 38 only after "rocking" has ceased. Ordinarily, a time delay of one second is sufficient. Electric time delay timers are well known and may be obtained having features whereby the time delay is adjustable and may be automatically reset and started by means of an externally supplied electrical impulse. The limit switch 39 may be employed to prevent automatic activation of the filling machine if a bag is improperly placed upon the filling spout 18, thus preventing accidental discharge of material.

Before commencing the bag filling operation, the switch actuators 28 and 29 are positioned to permit both switches 26 and 27, respectively, to be closed at the same time when a filled bag placed upon the weigh table 25 has a weight within a specified tolerance range. After determining the duration over which the scale "rocks" upon automatic placement of a filled bag upon the weigh table, a time interval is set into the time delay timer that is slightly longer than the duration of "rocking." Conveniently the time delay timer may be wired in parallel with conductors 32a and 33b, and the timer may be of a type provided with the previously described automatic reset and starting means, since in this case, the time will be automatically reset and the time elapse started upon sufficient depression of the weight table 25 to afford closure of both switches 26 and 27 at the same time.

In carrying out an operation wherein valve type bags are rapidly filled one after another, the filling machine 15 is set to discharge a preselected amount of material at each filling. The spacings between the depressible weigh table 25 and switch actuator members 28 and 29 are adjusted so that when the weigh table is depressed by a filled bag having the specified weight, both switches 26 and 27 will be in closed position.

The first bag is placed on the spout 18 of filling machine 15, and the push-button 19 is preset by the operator, thereby activating the filling machine circuitry and filling the bag. After the first bag is filled, it is automatically projected by ram 22 to conveyor 23, which conveys it to weight table 25.

If the filled bag possesses the specified weight, green lamp 35 lights, signaling the operator that the bag is on weight. The operator then places an unfilled bag on the filling spout 18. The filling machine will commence to fill the bag automatically when (a) the time set into the time delay timer 40 elapses, thereby closing switch 38 and (b) the bag is properly placed on the filling spout to close the limit switch 39.

If the filled bag is underweight, the red lamp 34 lights to signal that fact to the operator and he must then add material to the bag until it is on weight before another bag placed on the filling spout will be automatically filled. If the filled bag is overweight, the red lamp 36 lights and the operator must remove material from the filled bag to bring it on weight to permit automatic filling of the next bag.

The embodiment just-described affords an increase in the bag filling rate, reduces the burden placed on the operator and virtually eliminates the possibility of off weight bags passing the proving scale.

It will be understood that various changes may be made in apparatus and arrangements thereof, which have been referred to herein to explain the nature of the invention, without departing from its spirit or scope as expressed in the appended claims.

I claim:
1. Apparatus for activating electrically actuated means for filling containers with a predetermined quantity of material and for conveying the filled containers from said filling means, wherein the activating current is supplied to the filling means only when the previously-filled container is filled with the specified quantity of material, said apparatus comprising:
 (a) movable support means adjacent said conveying means for receiving and supporting the filled container, the movement of said support means being responsive to and proportional to the weight of the container supported thereby;
 (b) an electrical circuit adapted to transmit an activating current to the electrically actuated filling means;
 (c) a first electrical switch in said circuit, said switch being positioned so that a predetermined movement of said support means in response to the weight of a filled container supported thereby will cause said first switch to close, said predetermined movement of said supporting means being proportional to the minimum specified weight of said filled container;
 (d) a second electrical switch in said circuit, said second switch being positioned so that a second predetermined movement of said support means in response to the weight of a filled container supported thereby will cause said second switch to open, said second predetermined movement of said support means being proportional to the maximum specified weight of said filled container;
 (e) a third electrical switch in said electrical circuit;
 (f) time delay means for closing said third switch, said time delay means being adapted to close said third switch at a predetermined time sufficient to assure that rocking of said support means due to the placing of a filled container thereon has ceased, thereby preventing the activating of said filling means that would otherwise be occasioned by the positioning of said first and second switches in the closed position during said rocking of said support means, whereby premature filling of a container occasioned by the rocking of the previously-filled container on the support means is avoided, assuring that the loading operation is facilitated in an orderly fashion by preventing the filling of one container until it has been properly determined that the specified quantity of material is present in the previously-filled container.

2. Apparatus of claim 1 wherein said circuit further comprises a set of signal lamps that indicate, respectively, a response of said support means to a less-than-specified weight of a unit, a response of said support means to a specified weight of a unit and a response of said support means to a greater-than-specified weight of a unit.

3. The apparatus of claim 1 and including a fourth electrical switch in said activating circuit, said fourth switch being activated to its closed position when an unfilled container is properly secured to said filling means for filling with the predetermined amount of material, whereby the filling means is actuated only when the predetermined time delay period has elapsed, the specified amount of material is in the previously-filled container, and an unfilled container is properly positioned at the filling means.

References Cited

UNITED STATES PATENTS

| | | | |
|---|---|---|---|
| 2,632,589 | 3/1953 | Rowland | 177—118 |
| 2,741,450 | 4/1956 | Thayer et al. | 177—118 |
| 3,083,780 | 4/1963 | Swenson | 177—52 |

RICHARD B. WILKINSON, *Primary Examiner.*

GEORGE H. MILLER, JR., H. B. KATZ,
*Assistant Examiners.*